April 15, 1958 — W. E. KRESSIN — 2,830,445
FLEXIBLE COUPLING
Filed March 19, 1957
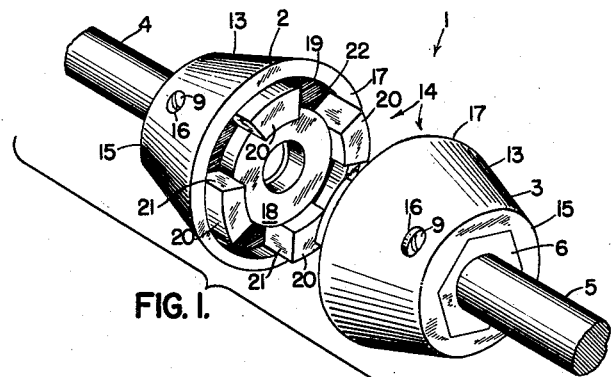
FIG. 1.
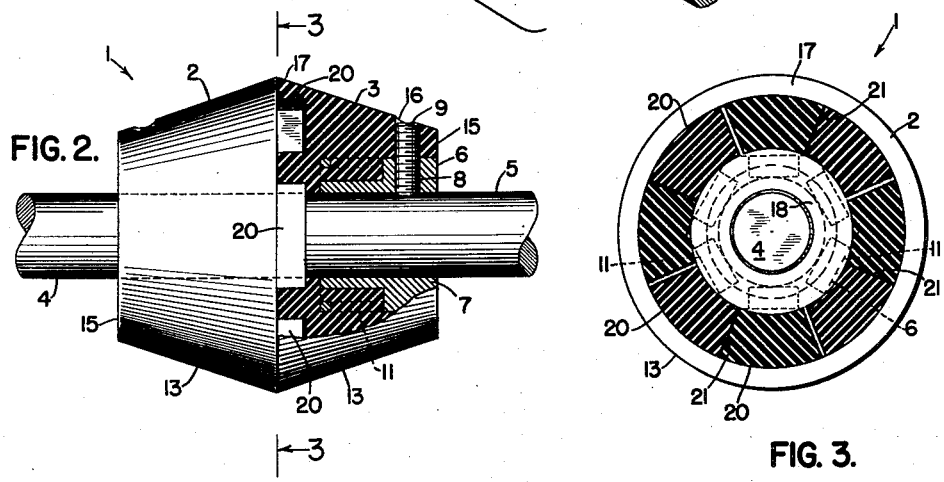
FIG. 2.
FIG. 3.
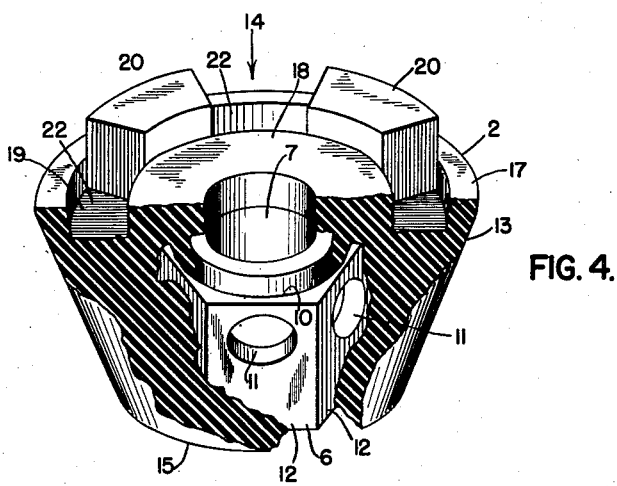
FIG. 4.
INVENTOR.
WILLIAM E. KRESSIN
BY Andrus & Sceales
ATTORNEYS.

United States Patent Office 2,830,445
Patented Apr. 15, 1958

2,830,445

FLEXIBLE COUPLING

William E. Kressin, Watertown, Wis.

Application March 19, 1957, Serial No. 647,041

3 Claims. (Cl. 64—14)

This invention relates to a flexible coupling for connecting the adjacent ends of a drive and driven shaft disposed generally in axial alignment and more particularly to an improved interlocking face for the separable coupling elements.

Reference is made to applicant's copending application entitled "Flexible Coupling," Serial No. 555,442, filed December 27, 1955, wherein applicant describes and claims a type of flexible coupling employing coupling elements, each of which comprises a metal hub insert adapted for securement on the ends of generally aligned shaft members to be coupled together. A cord rubber composition providing a relatively rigid coupling element having some resilience is molded onto the hub insert and is formed to provide a coupling face having axially extending and circumferentially spaced teeth adapted to interlock with and frictionally engage similar teeth provided on the other of the coupling elements to transmit a torque load between the shaft members. In the construction there described, the resilience of the material is adapted to accommodate relative movement between the shafts due to any misalignment therebetween.

The present invention provides an improved construction of the face of the coupling members whereby the interlocking teeth are confined both circumferentially and radially and thereby prevented from yielding radially under circumferential torque loads.

The drawings furnished herewith illustrate the best mode of carrying out the invention as presently contemplated and set forth hereinafter.

In the drawings:

Figure 1 is a perspective view of the flexible coupling showing the coupling elements mounted on their respective shafts and separated to show the interlocking face of one of the elements;

Fig. 2 is a side elevation of the flexible coupling with portions of one coupling element broken away and sectioned;

Fig. 3 is a view taken on line 3—3 of Fig. 2; and

Fig. 4 is an enlarged perspective view of one of the coupling elements with portions thereof broken away to show structural details of the element.

The flexible coupling 1 shown in the drawings includes the separable elements 2 and 3 mounted respectively on adjacent ends of shafts 4 and 5 disposed generally in axial alignment.

The respective coupling elements 2 and 3 are of identical construction and each includes a metal hub insert 6 having an axial bore 7 for receiving the end portions of the respective shafts 4 and 5. A threaded radial opening 8 is provided in each of the hub inserts 6 and is adapted to receive a set screw 9 for securing the insert onto the shaft. The outer end of each insert 6 adjacent to the shaft ends is provided with an annular groove 10 which is intercepted by recesses 11 provided in the several sides 12 of the insert.

An envelop 13 of an uncured cord rubber composition is molded over each insert 6 to provide relatively rigid frusto-conical coupling elements 2 and 3 having some resilience. In the molding process, the composition material fills the groove 10 of the insert and merges with the material flowing through the recesses 11 to provide an effective interlock between the insert 6 and the envelop 13. The material of envelop 13 is molded over the outer end of the hub insert 6 and provides the enlarged coupling face 14 generally at right angles to the axis and adjacent the shaft ends. The envelop 13 is formed generally flush with the insert 6 at the opposite smaller end 15 of each coupling element. An opening 16 extends through the envelop 13 in alignment with the threaded opening 8 of the insert to provide access to the set screw 9.

The coupling elements 2 and 3 are mounted on the adjacent ends of shafts 4 and 5 respectively, with their respective coupling faces 14 coupled together to transmit torque loads between the shafts in service.

According to the invention, the coupling face 14 formed on the resilient envelop 13 of each element 2 and 3 includes the relatively narrow axially extending circumferential outer flange 17, and the annular flange 18 spaced inwardly from flange 17 and extending axially a lesser amount than flange 17. The inner diameter of annular flange 18 corresponds generally to that of bore 7 of the hub insert 6 so that flange 18 in effect forms an extension thereof.

Flanges 17 and 18 are molded integrally with the envelop 13 and form an annular recess 19 therebetween. A plurality of angularly spaced teeth 20 are disposed in recess 19 and extend radially between the flanges 17 and 18 and axially beyond the flanges and into the recess 19 of the opposed coupling face. Each tooth 20 has a sector shaped cross-section with the engaging faces 21 thereof disposed generally radially with respect to the shaft axis to provide efficient loading of the teeth in driving engagement. The teeth 20 together with flanges 17 and 18 form sector shaped pockets 22 therebetween for receiving the teeth of the opposed coupling element in interlocking relation. To facilitate the assembly of coupling elements 2 and 3, pockets 22 may have an angular width somewhat larger than the angular width of teeth 20. The teeth on the respective coupling elements are molded integrally with the envelop 13 and flanges 17 and 18 to provide maximum securement area to reduce the unit loading thereof.

In assembling the elements 2 and 3 together, the relatively narrow opposed outer flanges 17 are brought into engagement and serve to index the opposed coupling faces 14 relative to each other. With elements 2 and 3 properly indexed, a predetermined clearance is provided between the remaining portions of the coupling faces 14 to accommodate the maximum anticipated angular misalignment of the shafts so that a very minimum of axial force is developed between the shafts due to such misalignment. Axial loading of the shafts due to the engagement of flanges 17 will be virtually negligible because the narrow flanges will deform readily in the axial direction. The engaged outer flanges 17 further serve to exclude foreign matter which may be present in service and might adversely affect the coupling.

By reason of the resilience of the materials forming the opposed coupling faces 14, the flanges 17 and 18 and teeth 20 will conform to the slight angularity caused by any angular misalignment of the shafts 4 and 5 in service and the inter-engaging faces 21 of the teeth will be maintained under substantially equal load and full engagement throughout each revolution of the shafts.

While the centrifugal forces at high rotational speeds may be considerable, the radial interlock provided by pockets 22 formed between the teeth 20 and flanges 17 and 18 will minimize the radial deflection of the teeth. The flanges 17 and 18 formed integrally with the teeth 20 also serve to reinforce the root securement of the teeth and thereby reduce the unit loading thereof.

Various modes of carrying out the invention are contemplated as being within the scope of the following claims particularly pointing out and distinctly claiming the subject matter which is regarded as the invention.

I claim:

1. In a flexible coupling wherein a pair of resilient coupling elements are mounted respectively on the ends of adjacent separable shafts and serve to transmit a torque load therebetween, said elements having identical opposed circular faces disposed generally at right angles to the respective shafts, resilient interlock means provided on the opposed faces of the coupling elements and comprising concentrically spaced flanges on one of said faces and aligned with similar flanges on the other of said faces, a plurality of radially disposed teeth connecting the spaced flanges on the respective faces and extending axially beyond the flanges, said teeth being angularly spaced and together with said flanges forming pockets therebetween for receiving the teeth of the opposed faces and thereby minimizing the radial deflection of the teeth due to the centrifugal forces developed in service.

2. In a flexible coupling wherein a pair of resilient coupling elements are mounted respectively on the ends of adjacent separable shafts and serve to transmit a torque load therebetween, said elements having identical opposed circular coupling faces disposed generally at right angles to the respective shafts, resilient interlock means provided on the opposed faces of the coupling elements and formed integrally with said elements, said interlock means including an axially extending peripheral flange formed on the opposed coupling faces, a second flange formed on the coupling faces and spaced inwardly from the peripheral flange to provide an annular recess therebetween, said second flange extending axially a lesser amount than said peripheral flange to provide an axial clearance between said second flanges in the assembled coupling, a plurality of radially disposed teeth extending axially beyond said flanges and connecting the spaced flanges on the respective faces and being angularly spaced and together with said flanges forming pockets therebetween, said teeth in coupled relation extending into the corresponding pockets on the opposed face with an axial clearance between the teeth and the pockets, said peripheral flanges on the opposed faces being engaged upon assembly of said interlock means and thereby serving to index the opposed coupling faces relative to each other to provide said axial clearances for accommodating anticipated angular misalignment between the shafts to minimize axial loading therebetween due to misalignment.

3. In a flexible coupling for connecting a pair of separable shafts, a pair of engageable coupling elements each comprising a metal insert having an axial bore for receiving an end of the respective shafts, an envelope of molded resilient material formed over each of said metal inserts and providing the coupling elements with a circular coupling face generally at right angles to the shafts, said envelop including an annular recess formed on the coupling faces and spaced respectively from the outer periphery of each face and from the shafts, a plurality of radially disposed teeth extending axially from the recess of each coupling face and molded integrally to the walls of the recess, said teeth having a sector shaped cross-section and being spaced angularly from each other an amount corresponding generally to the angular width of the teeth to form sector shaped pockets therebetween for receiving the teeth of the opposed coupling element in interlocking relation to transmit a torque load between the shafts in service, the walls of said recess serving to reinforce the root securement of the teeth and thereby reduce the unit loading thereof.

References Cited in the file of this patent

UNITED STATES PATENTS

| | | |
|---|---|---|
| 1,353,677 | Tomlinson | Sept. 21, 1920 |
| 2,025,827 | Ricefield | Dec. 31, 1935 |
| 2,098,703 | Geyer | Nov. 9, 1937 |
| 2,716,334 | Scott et al. | Aug. 30, 1955 |

OTHER REFERENCES

Serial No. 364,466, Dornig (A. P. C.), published May 4, 1943.